DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 5

T904,001

PROCESS FOR THE DISPERSION POLYMERIZATION OF A VINYLIDENE CHLORIDE COPOLYMER

Vernon Charles Haskell, Sleepy Hollow Estates, Va., assignor to E. I. du Pont de Nemours and Company, Wilmington, Del.

Original application July 12, 1967, Ser. No. 652,684. Divided and this application Feb. 27, 1970, Ser. No. 18,391

Int. Cl. C08f *45/28, 15/40*

U.S. Cl. 260—33.6 UA

No Drawing. 15 Pages Specification

A process for preparing a copolymer of vinylidene chloride characterized by spherical particles having an average diameter between about 1 micron and about 5 microns which comprises polymerizing between about 70% and about 85% by weight of vinylidene chloride, between about 10% and about 25% by weight of a monomer selected from the group consisting of methyl acrylate, methyl methacrylate and acrylonitrile, between about 3% and about 6% by weight of an unsaturated monocarboxylic acid selected from the group consisting of acrylic and methacrylic acids, in the presence of from 0.3% to 1.5% by weight, based upon the total weight of said monomers, of a free radical initiator and at a temperature between about 45° C. and about 65° C., in an aliphatic hydrocarbon solvent containing between about 5% and 15%, based upon the total weight of said monomers, of a polymeric dispersing agent comprising a copolymer of an alkyl ester of acrylic acid wherein the alkyl group contains between 4 and 8 carbon atoms with from 0.1% to 2%, by weight of the monomers, of a polymerizable monomer selected from the group consisting of allyl acrylate and allyl methacrylate. Alternatively, the polymerization monomers additionally include about 1% to 3% by weight, based upon the total weight of said monomers, of a cross-linking agent selected from the group consisting of allyl acrylate, allyl methacrylate, ethylene dimethacrylate, glycidyl methacrylate and glycidyl acrylate.

The vinylidene chloride copolymer characterized by the spherical particles can be coated onto a film base such as regenerated cellulose to improve the slip properties of the film base. The coating comprises (a) a first copolymer of vinylidene chloride and at least one other ethylenically unsaturated monomer and (b) a second copolymer of vinylidene chloride and at least one other ethylenically unsaturated monomer characterized by spherical particles in the amount of about 0.01 to 1.5 weight percent based on the weight of the first copolymer. These coated films are particularly useful in packaging foods.